United States Patent [19]

Weider et al.

[11] Patent Number: 5,717,027

[45] Date of Patent: Feb. 10, 1998

[54] BLOCK COPOLYCARBONATES WITH POLYISOBUTYLENE-α-HALOKETOCARBOXYLIC ACID BLOCKS

[75] Inventors: Richard Weider; Burkhard Köhler, both of Leverkusen; Wolfgang Ebert, Krefeld; Thomas Scholl, Bergisch Gladbach; Klaus Horn, Dormagen, all of Germany

[73] Assignee: Bayer AG, Leverkusen, Germany

[21] Appl. No.: 663,900

[22] Filed: Jun. 14, 1996

[30] Foreign Application Priority Data

Jun. 27, 1995 [DE] Germany ............... 195 22 776.2

[51] Int. Cl.$^6$ ............... C08L 69/00; C08G 64/18
[52] U.S. Cl. ............... 525/67; 525/90; 525/92 E; 525/146; 525/148; 528/191
[58] Field of Search ............... 525/67, 90, 92 E, 525/146, 148; 528/191

[56] References Cited

U.S. PATENT DOCUMENTS

| 4,786,690 | 11/1988 | Edwards | 525/345 |
| 5,023,299 | 6/1991 | Meuer | 525/146 |
| 5,041,502 | 8/1991 | Peters | 525/374 |

*Primary Examiner*—David Buttner
*Attorney, Agent, or Firm*—Connolly and Hutz

[57] ABSTRACT

This invention relates to block copolycarbonates made from polycarbonate blocks and polyisobutylene-α-haloketocarboxylic acid blocks (abbreviation: PIB blocks), wherein the PIB blocks may, for example, be obtained by ozonolysis of halogenated butyl rubber, and to blends of these block copolycarbonates with elastomers.

8 Claims, No Drawings

BLOCK COPOLYCARBONATES WITH POLYISOBUTYLENE-α-HALOKETOCARBOXYLIC ACID BLOCKS

This invention relates to block copolycarbonates made from polycarbonate blocks and polyisobutylene-α-haloketocarboxylic acid blocks (abbreviation: PIB blocks), wherein the PIB blocks may, for example, be obtained by ozonolysis of halogenated butyl rubber, and to blends of these block copolycarbonates with elastomers.

The block copolycarbonates according to the invention are distinguished by very good chemical resistance and are additionally suitable as blend components for thermoplastic and elastomer-modified moulding compositions which exhibit excellent impact strength and chemical resistance.

The present invention provides block copolycarbonates made from polycarbonate blocks and 0.5 to 30, preferably 1 to 25, in particular 5 to 20 wt. % (relative to the block copolycarbonate) of polyisobutylene-α-haloketocarboxylic acid blocks, wherein the polyisobutylene-α-haloketocarboxylic blocks have average molecular weights $M_n$ (number average) of between 500 and 50000, halogen contents (chlorine or bromine) of between 0.1 and 15, preferably between 0.5 and 5 wt. % (relative to the PIB block) and acid values of between 2 and 250 mg of KOH/g.

The block copolycarbonates according to the invention are produced by adding the polyisobutylene-α-haloketocarboxylic acids to the polycondensation reaction, i.e. to the production of polycarbonates from diphenols, phosgene, chain terminators and optionally branching agents.

The PIB blocks are incorporated into the polymer chain during phase interface polycondensation via ester bonds and additionally by the replacement of halogen via ether bonds.

The molecular weight $M_w$ (weight average, determined by light scattering) of the block copolycarbonates produced in this manner is generally between 8000 and 150000 or the block copolycarbonates have a relative solution viscosity of 1.15 to 1.5 (determined on a 0.5% solution in methylene chloride at 25° C.).

The polyisobutylene-α-haloketocarboxylic acids may be obtained, for example, by oxidative cleavage of halobutyl rubbers using known processes. In a particularly suitable process, ozone is used for oxidative cleavage.

The halobutyl rubbers required for the production process are commercially available, high molecular weight solid polymers which may be obtained by co-polymerisation of isobutylene with 0.3 to 15 mol. % of isoprene and subsequent careful halogenation in the alkyl position with elemental bromine or chlorine in solution. The isoprene is here substantially present linked in the 1,4 position. Small proportions of 1,2 linkages, as are present in all commercially available butyl rubber and which cannot be suppressed, give rise to equally small proportions of lateral carboxyl groups in the oxidation products. The halogen content in the halobutyl rubbers is between 0.1 and 15 wt. %, preferably between 0.5 and 5 wt. %. The Mooney viscosity of the halobutyl rubbers is between 30 and 80 (ML1+8, 125° C.) and the average molecular weight $M_n$ (number average, determined by gel permeation chromatography) is between 20000 and 1000000, preferably between 100000 and 500000. Suitable halobutyl rubbers are described, for example, in *Ullmann's Encyclopedia of Industrial Chemistry*, vol. A23 (1993), pages 314 et seq. Other 1,3 dienes are suitable as comonomers in addition to isoprene, but such products are not commercially available. Suitable comonomers are cited, for example, in H. Güterbock, *Polyisobutylene und Isobutylen-Mischpolymerisate*, Springer Verlag, Berlin 1959.

Oxidative treatment of halobutyl rubber solutions with ozone cleaves any double bonds still present in the halobutyl rubbers, reducing molecular weight and forming carboxyl/ketone or aldehyde groups. Depending upon the starting polymer used, chlorine or bromine are located in the α-position relative to the carboxyl or carbonyl groups.

The acid value and the molecular weight of the polyisobutylene-α-haloketo-carboxylic acids obtainable in this manner is dependent upon the isoprene or diene content in the copolymer and the selected excess of ozone. It is generally between 2 and 250 mg of KOH/g, preferably between 2 and 100 mg of KOH/g, particularly preferably between 2 and 50 mg of KOH/g. The molecular weight $M_n$ (number average determined by HPGPC) of the products is generally between 500 and 50000, preferably between 1000 and 10000, the halogen content corresponds to that of the halobutyl rubbers used. The polyisobutylene-α-haloketocarboxylic acids are novel and are also provided by the present application.

Thermoplastic, aromatic polycarbonates suitable for the purposes of the invention are those based on diphenols of the formula (I)

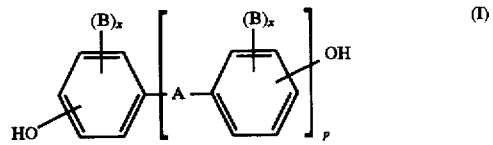

in which

A is a single bond, $C_1$-$C_5$ alkylene, $C_2$-$C_5$ alkylidene, $C_5$-$C_6$ cycloalkylidene, —S—, or —SO$_2$—, B is chlorine, bromine x is 0, 1 or 2 and p is 1 or 0 or alkyl-substituted dihydroxyphenylcycloalkanes of the formula (II),

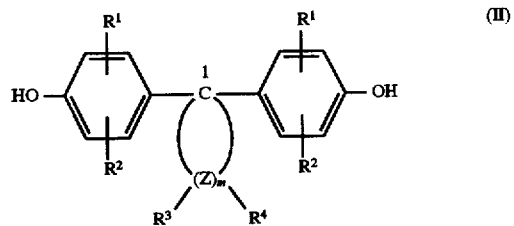

in which $R^1$ and $R^2$ mutually independently mean hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, in particular benzyl, m means a number from 4 to 7, preferably 4 or 5, $R^3$ and $R^4$ mutually independently, individually selectably for each Z mean hydrogen or $C_1$-$C_6$ alkyl and Z means carbon, providing that $R^3$ and $R^4$ simultaneously mean alkyl on at least one atom Z.

Hydroquinone, resorcinol, dihydroxydiphenyl, bis-(hydroxyphenyl)alkanes, bis-(hydroxyphenyl)cycloalkanes, bis-(hydroxyphenyl) sulphides, ethers, ketones, sulphoxides, sulphones and α, α-bis-(hydroxyphenyl) diisopropylbenzenes together with the ring-alkylated and ring-halogenated compounds thereof may be cited by way of example.

Suitable diphenols are described, for example, in U.S. Pat. Nos. 3,028,365, 2,999,835, 3,062,781, 3,148,172 and 4,982, 014, in German published patent applications 1 570 703 and 2 063 050 and in the monograph by H. Schnell *Chemistry and Physics of Polycarbonates*, Interscience Publishers, New York, 1964.

Preferred diphenols are
4,4'-dihydroxydiphenyl,
2,2-bis-(4-hydroxyphenyl)propane,
2,4-bis-(4-hydroxyphenyl)-2-methylbutane,
1,1-bis-(4-hydroxyphenyl)cyclohexane,
α,α-bis-(4-hydroxyphenyl)-p-diisopropylbenzene,
2,2-bis-(3-methyl-4-hydroxyphenyl)propane,
2,2-bis-(3-chloro-4-hydroxyphenyl)propane,
bis-(3,5-dimethyl-4-hydroxyphenyl)methane,
2,2-bis-(3,5-dimethyl-4-hydroxyphenyl)propane,
bis-(3,5-dimethyl-4-hydroxyphenyl)sulphone,
2,4-bis-(3,5-dimethyl-4-hydroxyphenyl)-2-methylbutane,
1,1-bis-(3,5-dimethyl-4-hydroxyphenyl)cyclohexane,
α,α'-bis-(3,5-dimethyl-4-hydroxyphenyl)-p-diisopropylbenzene,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)propane and
2,2-bis-(3,5-dibromo-4-hydroxyphenyl)propane.

Particularly preferred diphenols are, for example:
2,2-bis-(4-hydroxyphenyl)propane,
2,2-bis-(3,5-dimethyl-4-hydroxyphenyl)propane,
2,2-bis-(3,5-dichloro-4-hydroxyphenyl)propane,
2,2-bis-(3,5-dibromo-4-hydroxyphenyl)propane,
1,1-bis-(4-hydroxyphenyl)cyclohexane,
1,1-Bis-(4-hydroxyphenyl)-3,3,5-trimethylcyclohexane,
1,1-bis-(4-hydroxyphenyl)-3-methylcyclohexane,
1,1-bis-(3,5-dimethyl-4-hydroxyphenyl)-4-methylcyclohexane.

2,2-Bis-(4-hydroxyphenyl)propane and 1,1-bis-(4-hydroxyphenyl)-3,3,5-trimethylcyclohexane are in particular preferred.

Any desired mixtures of the above-stated diphenols may also be used.

In order to improve flow behaviour, it is possible also to use in a known manner small quantities, preferably quantities between 0.05 and 2.0 mol. % (relative to moles of diphenols used) of trifunctional or greater than trifunctional compounds, in particular those with three or more than three phenolic hydroxyl groups. Some of the usable compounds with three or more than three phenolic hydroxyl groups are, for example, 1,3,5-tri-(4-hydroxyphenyl)benzene, 1,1,1-tri-(4-hydroxyphenyl)-ethane, 2,6-bis-(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)-ortho-terephthalic acid ester, tetra-(4-hydroxyphenyl)methane and 1,4-bis-(4',4"-dihydroxytriphenyl)methylbenzene. Some other trifunctional compounds are 2,4-dihydroxybenzoic acid, trimesic acid, cyanuric chloride and 3,3-bis-(4-hydroxy-3-methylphenyl)-2-oxo-2,3-dihydroindole.

The block polycarbonates according to the invention may be produced substantially using the known solution process in disperse phase (so-called two phase interface process) (c.f. H. Schnell, *Chemistry and Physics of Polycarbonates, Polymer Review*, vol. IX, page 27 et seq., Interscience Publ. 1964):

In this process, the diphenols to be used are dissolved in an aqueous alkaline phase. To this end, the chain terminators required for production of the polycarbonates according to the invention are added in quantities of 1 to 20 mol. %, relative to moles of diphenol, either dissolved in an organic solvent or as the material alone. The reaction with phosgene is then performed in the presence of an inert organic phase which preferably dissolves polycarbonate. The reaction temperature is between 0° C. and 40° C. The polyisobutylene-α-haloketocarboxylic acids are added in the desired quantity to the reaction as the pure material or dissolved in the solvent constituting the organic phase.

The necessary chain terminators may also be added in the above-stated manner and quantity during phosgenation.

Suitable organic solvents for the chain terminators are, for example, methylene chloride, chlorobenzene, mixtures of methylene chloride and chlorobenzene, acetone, acetonitrile, toluene.

The reaction may be assisted by catalysts such as tributylamine or triethylamine. In order to assist incorporation of the chain terminator, it is possible also to use onium salts, such as for example tetraalkylammonium halides as phase transfer catalysts.

If branching agents are also used, they may be added before the reaction with phosgene or during phosgenation.

In addition to or instead of the diphenols, it is also possible to use the copolycarbonates thereof.

The block copolycarbonates are isolated in a known manner. Suitable working up processes are in particular precipitation, spray drying and evaporation of the solvent under a vacuum.

In addition to the diphenols, it is also possible to use up to 50 mol. %, relative to the diphenols used, of the bischlorocarbonates thereof.

Conventional quantifies of additives conventional in thermoplastic polycarbonates, such as stabilisers, mould release agents, pigments, flame retardants, anti-static agents, fillers and reinforcing materials may be added to the block copolycarbonates according to the invention before or after processing.

The block copolycarbonates may be processed into mouldings, for example, by extruding the block copolycarbonates isolated in a known manner into pellets and injection moulding these pellets in a known manner into various articles, optionally after addition of the above-stated additives.

The block copolycarbonates according to the invention may be used as mouldings in any applications where hitherto known polycarbonates have been used, thus for example in the electrical and construction sectors, in particular when elevated chemical resistance is required.

Examples of applications are films, composite films, extruded and injection moulded articles both with and without fillers or glass fibre reinforcement, such as for example safety helmets, foams, sheet goods and blow moulded articles, together with medical articles such as tubes and short term implants.

The block copolycarbonates according to the invention are also used as blend components for thermoplastic moulding compositions.

The present invention accordingly provides thermoplastic moulding compositions containing A) 5 to 98, preferably 10 to 50, particularly preferably 10 to 30 parts by weight of block copolycarbonates according to the invention, B) 0 to 99, preferably 20 to 88, particularly preferably 30 to 88 parts by weight of aromatic polycarbonates
and optionally C) 2 to 20, preferably 2 to 10, particularly preferably 5 to 10 parts by weight of polyisobutylene
or D) 5 to 50, preferably 10 to 50, particularly preferably 20 to 50 parts by weight of graft polymer, wherein the sum of all parts by weight of components A+B+C+D is 100, providing that the content of polyisobutylene-α-haloketocarboxylic acids in the overall mixture (of A+B+C+D) is 0.5 to 20, preferably 0.5 to 5 wt. % relative to 100 wt. % and providing that the mixture contains component B) if component C) or D) are not present.

For mixtures prepared from components A), B) and optionally C), the content of PIB blocks in the overall mixture is in particular 0.5 to 4 wt. %.

For mixtures prepared from components A), D) and optionally B), the content of PIB blocks in the overall mixture is in particular 1 to 5 wt. %.

The aromatic polycarbonates which may be added to the mixture correspond to the polycarbonates described in the block copolycarbonates.

The thermoplastic, aromatic polycarbonates have weight average molecular weights ($M_w$), measured by ultracentrifugation or light scattering, of 10000 to 200000, preferably of 20000 to 80000 or have a relative solution viscosity (determined with a 0.5% solution in methylene chloride at 25° C.) of 1.15 to 1.5. Component B) comprises aromatic polycarbonates based on diphenols of the above-stated formulae (I) and/or (II) and described above.

Component C) PIB rubbers of the present invention are cationic polymers of olefins and optionally dienes with an isobutylene content of at least 85%. Polyisobutylenes are described under the entry "Polyisobutylene" on page 3539, volume 5 of *Römpp Chemie Lexikon*, 9th edition, 1992, Georg Thieme Verlag. The molecular weight of the polyisobutylenes to be used according to the invention is 1000 to 5000000, preferably 10000 to 1200000 g/mol. This value is determined by light scattering.

Dienes suitable as comohomers for isobutylene are, for example, butadiene, isoprene, 2-chloro-1,4-butadiene, 2-bromo-1,3-butadiene, pentadiene, hexadiene, 2-ethyl-1,3-butadiene, 2-propyl-1,3-butadiene, 2-phenyl-1,3-butadiene, 2-methyl-1,3-pentadiene or 3-propylhexadiene.

Other suitable olefinic comohomers are styrene, α-methylstyrene, m/p-methyl-styrene or divinylbenzene.

Such products are commercially available as butyl rubbers.

Graft polymers (according to component D)) comprise, for example, graft copolymers with rubber-elastic properties which may substantially be obtained from at least two of the following monomers: chloroprene, 1,3-butadiene, isoprene, styrene, acrylonitrile, ethylene, propylene, vinyl acetate and (meth)acrylic acid esters with 1 to 18 C atoms in the alcohol component; i.e. polymers as are, for example, described in *Methoden der Organischen Chemie* (Houben-Weyl), volume 14/1, Georg Thieme Verlag, Stuttgart 1961, pages 393–406 and in C. B. Bucknall, *Toughened Plastics*, Appl. Science Publishers, London 1977. Preferred polymers D) are partially crosslinked and have gel contents of above 20 wt. %, preferably of above 40 wt. %, in particular of above 60 wt. %.

Preferred graft polymers D) comprise graft polymers prepared from:

D.1) 5 to 95, preferably 30 to 80 parts by weight of a mixture of

D.1.1) 50 to 95 parts by weight of styrene, α-methylstyrene, styrene ring-substituted by halogen or methyl, $C_1$-$C_8$ alkyl methacrylate, in particular methyl methacrylate, $C_1$-$C_8$ alkyl acrylate, in particular methylacrylate, or mixtures of these compounds and D.1.2) 5 to 50 parts by weight of acrylonitrile, methacrylonitrile, $C_1$-$C_8$ alkyl methacrylates, in particular methyl methacrylate, $C_1$-$C_8$ alkyl acrylate, in particular methylacrylate, maleic anhydride, $C_1$-$C_4$ alkyl or phenyl N-substituted maleimides or mixtures of these compounds on D.2) 5 to 95, preferably 20 to 70 parts by weight of a polymer with a glass transition temperature of below −10° C.

Preferred graft polymers D) are, for example, polybutadienes, butadiene/styrene copolymers and acrylate rubbers grafted with styrene and/or acrylonitrile and/or (meth)acrylic acid alkyl esters; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, as are described, for example, in DE-OS 2 348 377 (=U.S. Pat. No. 3,919, 353).

Particularly preferred polymers D) are, for example, ABS polymers, as are described, for example, in DE-OS 2 035 390 (=U.S. Pat. No. 3,644,574) or in DE-OS 2 248 242 (=GB-PS 1 409 275).

Particularly preferred graft polymers D) are graft polymers which may be obtained by a grafting reaction of I. 10 to 70, preferably 15 to 50, in particular 20 to 40 wt. %, relative to the graft product, of at least one (meth)acrylic acid ester or 10 to 70, preferably 15 to 50, in particular 20 to 40 wt. % of a mixture prepared from 10 to 50, preferably 20 to 35 wt. %, relative to the mixture, of acrylonitrile or (meth)acrylic acid ester and 50 to 90, preferably 65 to 80 wt. %, relative to the mixture, of styrene on II. 30 to 90, preferably 50 to 85, in particular 60 to 80 wt. %, relative to the graft product, of a butadiene polymer containing at least 50 wt. %, relative to II, of butadiene residues as the grafting backbone, wherein, preferably, the gel content of the grafting backbone II is at least 70 wt. % (measured in toluene), the degree of grafting G is 0.15 to 0.55 and the average particle diameter $d_{50}$ of the graft polymer C) is 0.05 to 2, preferably 0.1 to 0.6 μm.

(Meth)acrylic acid esters I are esters of acrylic or methacrylic acid and monohydric alcohols with 1 to 18 C atoms. Methyl, ethyl and propyl methacrylate are particularly preferred.

The grafting backbone II may contain in addition to butadiene residues up to 50 wt. %, relative to II, of residues of other ethylenically unsaturated monomers, such as styrene, acrylonitrile, acrylic or methacrylic acid esters with 1 to 4 C atoms in the alcohol component (such as methyl acrylate, ethyl acrylate, methyl methacrylate, ethyl methacrylate), vinyl esters and/or vinyl ethers. The preferred grafting backbone II consists of pure polybutadiene.

Since, as is known, the graft monomers are not necessarily completely grafted onto the grafting backbone during the grafting reaction, for the purposes of the invention graft polymers D) are also taken to be such products as are obtained by polymerisation of the graft monomers in the presence of the grafting backbone, for example SAN copolymer.

The degree of grafting G describes the weight ratio of grafted graft monomers to the grafting backbone and is dimensionless.

The $d_{50}$ average particle size is the diameter, both above and below which are located 50 wt. % of the particles. This value may be determined by ultracentrifugation measurements (W. Scholtan, H. Lange, *Kolloid, Z. & Z. Polymere* 250 (1972), 782–796).

Particularly preferred graft polymers D) are, for example, also graft polymers prepared from (a) 20 to 90 wt. %, relative to D), of acrylate rubber with a glass transition temperature of below −20° C. as the grafting backbone and (b) 10 to 80 wt. %, relative to D), of at least one polymerisable, ethylenically unsaturated monomer, the homo- or copolymers of which, produced in the absence of a), would have a glass transition temperature of above 25° C., as the grafting monomers.

The acrylate rubbers (a) of the polymers D) are preferably polymers prepared from acrylic acid alkyl esters, optionally with up to 40 wt. %, relative to (a), of other polymerisable, ethylenically unsaturated monomers. Preferred polymerisable acrylic acid esters include $C_1$-$C_8$ alkyl esters, for example methyl, ethyl, n-butyl, n-octyl and 2-ethylhexyl esters; haloalkyl esters, preferably halo-$C_1$-$C_8$-alkyl esters, such as chloroethyl acrylate, together with mixtures of these monomers.

Monomers with more than one polymerisable double bond may be copolymerised for the purpose of crosslinking. Preferred examples of crosslinking monomers are esters of unsaturated monocarboxylic acids with 3 to 8 C atoms and unsaturated monohydric alcohols with 3 to 8 C atoms and unsaturated monohydric alcohols with 3 to 12 C atoms or saturated polyols with 2 to 4 OH groups and 2 to 20 C atoms, such as for example ethylene glycol dimethacrylate, allyl methacrylate; polyunsaturated heterocyclic compounds, such as for example trivinyl and triallyl cyanurate; polyfunctional vinyl compounds, such as di- and trivinylbenzenes; as well as triallyl phosphate and diallyl phthalate.

Preferred crosslinking monomers are allyl methacrylate, ethylene glycol dimethacrylate, diallyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine, triallylbenzenes.

The quantity of crosslinking monomers is preferably 0.02 to 5, in particular 0.05 to 2 wt. %, relative to the grafting backbone (a).

In the case of cyclic crosslinking monomers with at least three ethylenically unsaturated groups, it is advantageous to limit the quantity to below 1 wt. % of the grafting backbone (a).

Preferred "other" polymerisable, ethylenically unsaturated monomers which may optionally be used for production of the grafting backbone (a) in addition to the acrylic acid esters are, for example, acrylonitrile, styrene, α-methylstyrene, acrylamides, vinyl $C_1$-$C_6$ alkyl ethers, methyl methacrylate, butadiene. Preferred acrylate rubbers as the grafting backbone (a) are emulsion polymers having a gel content of at least 60 wt. %.

Further suitable grafting backbones are silicone rubbers with active grafting sites, as are described in DE 37 04 657, DE 37 04 655, DE 36 31 540 and DE 36 31 539.

The gel content of the grafting backbone (a) is determined at 25° C. in dimethylformamide (M. Hoffmann, H. Krömer, K. Kuhn, *Polymeranalytik I & II*, Georg Thieme Verlag, Stuttgart 1977).

The components are mixed by melt mixing in kneaders or extruders at elevated temperature, generally at temperatures of 230° to 330° C.

The mixtures of the components according to the invention may also contain conventional additives conventional for polycarbonates or butyl rubbers, such as for example stabilisers, mould release agents, antioxidants, flame retardants, fillers and reinforcing materials, pigments, colorants etc., for example carbon black. These additives may be added in conventional quantities during conversion of the mixtures into any desired mouldings.

The moulding compositions according to the invention may be used for the production of mouldings of any kind, for example by injection moulding. Examples of mouldings are housings for household appliances and electrical appliances.

The present invention accordingly also provides the use of the moulding compositions for the production of mouldings.

The individual components of the mixture may entirely or partially consist of recycled material or production waste.

EXAMPLES

Example 1

A) Production of a polyisobutylene-α-haloketocarboxylic acid containing chlorine 10 kg of chlorobutyl rubber with a chlorine content of 1.2 wt. % and a Mooney viscosity of 46 (ML 1+8, 125° C.) (Polysar Chlorobutyl 1255, commercial product of Bayer AG) are chopped into coarse pieces (diameter approximately 2 cm) and suspended in 40 l of hexane. An ozone-enriched stream of oxygen (1000 l/h, approximately 15 g/h of ozone) are introduced into the mixture with stirring at 15° to 25° C. until an acid value of 11 has been achieved. The period of introduction required for this purpose is 40 hours. The solids dissolve completely during this period of introduction. After purging with nitrogen, the solvent is removed by distillation. The average molecular weight ($M_n$) is 4400, the chlorine content is 1.2 wt. %, the acid value is 13.

B) Production of a PC/PIB block cocondensation product 8000 g of 45% NaOH, 40 l of water, 4560 g of bisphenol A, 45 g of tert.-butylphenol, 564 g of telechelic PIB containing chlorine according to example 1A), 13.2 kg of chlorobenzene and 37.2 kg of methylene chloride are initially introduced into a vessel, 3000 g of phosgene are introduced and condensation is performed with the addition of 28 ml of N-ethylpiperidine. Isolation is performed as is conventional by acidification, separation of the organic phase and evaporation in a vented extruder. The block copolycarbonate has a PIB content of 10 wt. %.

Relative solution viscosity (0.5% in methylene chloride at 25° C.) is 1.37.

A material is obtained with a rubber/glass transition of −20° C. in notched impact testing (ISO 180).

After 2 minutes' exposure to 1:1 isooctane/toluene at an outer fibre strain of 0.6%, bars of this material did not fail in the subsequent flexural impact test (ISO 179).

Example 2

(Production of a PC/PIB block co-condensation product)

8000 g of 45% NaOH, 40 l of water, 4560 g of bisphenol A, 45 g of tert.-butylphenol, 1270 g of telechelic PIB containing chlorine according to example 1, 13.2 kg of chlorobenzene and 37.2 kg of methylene chloride are initially introduced into a vessel, 3000 g of phosgene are introduced and condensation is performed with the addition of 28 ml of N-ethylpiperidine. Isolation is performed as is conventional by acidification, separation of the organic phase and evaporation in a vented extruder. The block copolycarbonate has a PIB content of 20 wt. %.

Relative solution viscosity (0.5% in methylene chloride at 25° C.) is 1.34.

A material is obtained with a rubber/glass transition of −20°/−30° C. in notched impact testing (ISO 180).

Melt viscosity at 1000 l/s and 300° C. is 59 Pa -s (unmodified PC with a relative solution viscosity of 1.28 exhibits a melt viscosity of 360 Pa -s).

After 2 minutes' exposure to 1:1 isooctane/toluene at an outer fibre strain of 0.6%, bars of this material did not fail in the subsequent flexural impact test (ISO 179).

Example 3

Production of a blend of the following composition:

10 parts by weight of PC/PIB block copolycarbonate according to example 2

82 parts by weight of polycarbonate 8 parts by weight of polyisobutylene rubber 2050 g of bisphenol A polycarbonate with a relative solution viscosity of 1.28 (0.5% solution in methylene chloride at 25° C.), 250 g of PC/PIB block cocondensation product according to example 2 and 200 g of polyisobutylene rubber with approximately 2 wt. % of isoprene as comonomer and a molecular weight of approximately 400000 g/mol are dissolved in a mixture of 8 l of chlorobenzene and 8 l of methylene chloride and together evaporated in a ZSK 32 twin screw co-extruder with a vacuum dome.

A material is obtained with a rubber/glass transition of −20° C. in notched impact testing (ISO 180).

Melt viscosity at 1000 l/s and 300° C. is 147 Pa -s.

After 2 minutes' exposure to 1:1 isooctane/toluene at an outer fibre strain of 0.6%, bars of this material did not fail in the subsequent flexural impact test (ISO 179).

Example 4

Production of a blend with the following composition 20 parts by weight of PC/PIB block copolycarbonate according to example 2

40 parts by weight of polycarbonate 40 parts by weight of ABS graft polymer

The polycarbonate used is a bisphenol A based polycarbonate with a relative solution viscosity of 1.26 (0.5% solution in methylene chloride at 25° C.).

The ABS graft polymer used is a mixture prepared from 42 parts of a graft polymer of 50 parts by weight of styrene and acrylonitrile in a 72:28 weight ratio onto 50 parts by weight of particulate, crosslinked polybutadiene rubber (average particle diameter ($d_{50}$)) of 0.4 μm, obtained by emulsion polymerisation, and 58% of styrene/acrylonitrile resin (S:AN 72:28).

The components are mixed at 200° C. in a kneader and extruded.

Test specimens still exhibit ductile failure (51 kJ/m$^2$) at −40° C. in notched impact testing (to ISO 180).

Comparative example

A blend prepared from 60 wt. % of bisphenol A based polycarbonate with a relative solution viscosity of 1.26 (0.5% solution in methylene chloride at 25° C.) and 40 wt. % of the above-stated ABS graft polymer is compounded in a kneader at 200° C. and extruded. Test bars exhibit brittle failure (34.6 kJ/m$^2$) at −40° C. in notched impact testing (to ISO 180).

We claim:

1. Block copolycarbonates made from polycarbonate blocks and 0.5 to 30 wt. % relative to the block copolycarbonate, of polyisobutylene-α-haloketocarboxylic acid blocks, wherein the polyisobutylene-α-haloketocarboxylic blocks have average molecular weights if, $\overline{M}_n$ (number average) of between 500 and 50000, halogen contents of between 0.1 and 15 wt. % relative to PIB block and acid values of between 2 and 250 mg of KOH/g.

2. Block copolycarbonates according to claim 1, wherein the molecular weight ($\overline{M}_w$) of the block copolycarbonates is 8000 to 150000.

3. Block copolycarbonates according to claim 1, wherein the polyisobutylene-α-haloketocarboxylic acid blocks have average molecular weights $\overline{M}_n$ (number average) of 50 to 50000.

4. Block copolycarbonates according to claim 1, wherein the halogen content of the PIB block is 0.5 to 5 wt. %.

5. Process for the production of block copolycarbonates according to claim 1, wherein diphenols, phosgene, are reacted using the solution process in the disperse phase in the presence of chain terminators, optionally in the presence of branching agents and/or catalysts with the addition of polyisobutylene-α-haloketocarboxylic acids.

6. Thermoplastic moulding compositions containing
   A) 10 to 98 parts by weight of block copolycarbonates according to claim 1,
   B) 0 to 88 parts by weight of aromatic polycarbonates and optionally
   C) 2 to 20 parts by weight of polyisobutylene or
   D) 5 to 50 parts by weight of graft polymer, wherein the sum of all parts by weight of components A+B+C+D is 100,
   providing that the content of polyisobutylene-α-haloketocarboxylic acids in the overall mixture (of A+B+C+D) is 0.5 to 20 wt. % relative to 100 wt. % and providing that the mixture contains component B) if components C) or D) are not present.

7. Thermoplastic moulding compositions according to claim 6, wherein the graft polymers are obtained from at least two of the following monomers:

chloroprene, 1,3-butadiene, isoprene, styrene ring-substituted by halogen or methyl, ethylene, propylene, vinyl acetate, $C_1$-$C_{18}$ alkyl methacrylate, $C_1$-$C_{18}$ alkyl acrylate, maleic anhydride, $C_1$-$C_4$ alkyl or phenyl N-substituted maleimides.

8. Thermoplastic moulding compositions according to claim 6 containing additives selected from the group consisting of stabilisers, mould release agents, antioxidants, flame retardants, pigments, colorants, fillers and reinforcing materials.

* * * * *